United States Patent [19]

Sheller et al.

[11] Patent Number: 5,238,650
[45] Date of Patent: Aug. 24, 1993

[54] ELECTRODE FEED THROUGH

[75] Inventors: David T. Sheller, Garrettsville; Gordon W. Brunson, Chagrin, both of Ohio

[73] Assignee: W. R. Grace & Co.-Conn., New York, N.Y.

[21] Appl. No.: 759,172

[22] Filed: Sep. 13, 1991

[51] Int. Cl.[5] ............................. F01N 3/10; H01R 9/00; H01R 13/02
[52] U.S. Cl. .................................... 422/174; 439/886; 439/887; 439/519; 219/541; 219/205
[58] Field of Search .................. 422/174; 439/34, 766, 439/801, 886, 887, 890, 519; 219/205, 541

[56] References Cited

U.S. PATENT DOCUMENTS

| | | | |
|---|---|---|---|
| 4,499,054 | 2/1985 | Katsura et al. | 422/98 |
| 4,928,485 | 5/1990 | Whittenberger | 422/174 |
| 5,053,603 | 10/1991 | Wagner et al. | 219/205 |
| 5,070,694 | 12/1991 | Whittenberger | 422/174 |
| 5,140,812 | 8/1992 | Cornelison et al. | 422/174 |

*Primary Examiner*—Robert J. Warden
*Assistant Examiner*—Stephanie Smith
*Attorney, Agent, or Firm*—Edward J. Cabic

[57] ABSTRACT

There is provided a terminal especially adapted for use with an electrically heatable catalytic converter having a stud, a portion of said stud being coated with a thin layer of a ceramic, and a sleeve having an interference fit with said coated portion, said stud adapted to be welded at its inner end to one side of a resistance circuit. There is also provided an electrically heatable catalytic converter including such a terminal.

13 Claims, 2 Drawing Sheets

ELECTRODE FEED THROUGH

This invention relates to an electrode feed through assembly especially adapted for use with an electrically heatable catalytic converter to carry electric current through a surrounding metallic housing to an electrically heatable catalytic converter core without shorting to said housing.

BACKGROUND OF THE INVENTION AND PRIOR ART

The purpose of a catalytic converter is to convert pollutant materials in engine or turbine exhaust, e.g., carbon monoxide, unburned hydrocarbons, nitrogen oxides etc., to carbon dioxide, nitrogen, and water. Conventional catalytic converters utilize an oval cross-section ceramic honeycomb monolith 4 to 8 inches long having square, circular, triangular or hexagonal axially extending straight through openings or cells with a noble metal catalyst deposited in the cells. Other types of catalytic converters include catalyst coated refractory metal oxide beads or pellets, e.g., alumina beads, and a corrugated thin metal foil monolith, e.g., ferritic stainless steel foil, having a catalyst supported on the surface, usually a refractory metal oxide surface. The catalyst is normally a noble metal metal, e.g., platinum, palladium, rhodium, ruthenium, or a mixture of two or more such metals. The catalyst catalyzes a chemical reaction, mainly oxidation, whereby pollutant ingredients in the exhaust are converted to harmless by-products which then pass through the exhaust system to the atmosphere.

However, conversion is not efficient initially when the exhaust gases and the converter are relatively cold. To be effective at a high conversion rate, the catalyst and the surface of the converter must be at a minimum temperature, e.g., 390 F. for carbon monoxide, 570 F. for volatile organic compounds (VOC) including unburned hydrocarbons, and 1000 F. for methane or natural gas. Otherwise, conversion to harmless by-products is poor and cold start pollution of the atmosphere is high. Once the exhaust system has come to its operating temperature, the catalytic converter is optimally effective. Hence, it is necessary to contact relatively cold exhaust gases with hot catalyst to effect satisfactory conversion at engine start-up. Both compression ignited and spark ignited internal combustion engines have this need. Gas turbines also have this need.

To achieve initial heating of the catalyst prior to engine start-up, current practice provides an electrically heatable catalytic converter formed usually of a corrugated thin metal foil monolith which is connected a voltage source, e.g., a 12 volt to 108 volt automotive battery, and power is supplied, preferably before, during and after engine ignition to elevate and maintain the temperature of the catalyst to at least 650 F. plus or minus 20 F. The initial heat up time prior to engine ignition is from 2 to 30 seconds, and post crank heating, on demand.

The resistance of the corrugated thin metal monolith is used to heat the converter and accordingly electric power must be supplied to the monolith at opposite ends of a corrugated thin metal strip or strips from which the monolith is made. To accomplish this, at least one electrode must extend through the housing and be electrically isolated from the housing. Where only one electrode is used, the housing, being attached to the chassis, becomes the opposite pole of the voltage source. Where two electrodes of opposite charge are used, both must extend, in electrically isolated manner, through the housing and be attached to the monolith.

With prior insulated terminals or electrodes, gas leakage has occurred and it has now been found desirable to pneumatically seal the electrode or electrodes. Leakage is unacceptable because it causes oxygen sensors in the vehicle's emission system to malfunction.

Reference may be had to U.S. Pat. No. 4,711,009 to Cornelison et al dated Dec. 8, 1987 for details of a process for corrugating and coating thin metal foil strips and applying the catalyst, which process without the final steps of creasing and folding the strip may be used herein. Lengths of coated corrugated strip are secured as by welding to a tubular central core member, closed at least one end, and spirally wound about the core. The outer ends are brazed to an outer metallic shell.

In the following description, reference will be made to "ferritic" stainless steel. A suitable formulation for this alloy will be found in U.S. Pat. No. 4,414,023 dated Nov. 8, 1983 to Aggen. A specific ferritic stainless steel alloy useful herein contains 20% chromium, 5% aluminum, and from 0.002% to 0.05% of at least one rare earth selected from cerium, lanthanum, neodymium, yttrium, praseodymium, and mixtures of two or more thereof, balance iron, and trace steel making impurities.

In the following description, reference will also be made to fibrous ceramic mat or insulation. Reference may be had to the U.S. Pat. No. 3,795,524 dated Mar. 5, 1974 to Sowman for formulation and manufacture of ceramic fibers and mats useful herein. One such ceramic fiber material is currently commercially available from 3-M under the registered trademark "INTERAM."

A brazing foil, which is an alloy of nickel, chromium, silicon, and boron useful herein is available commercially from Allied Metglas Products of Parsippany, N.J.

BRIEF STATEMENT OF THE INVENTION

Briefly stated, the present invention is a terminal for an electrical connection comprising a stud, preferably of nickel or ferritic stainless steel, a ceramic coating about an axially extending portion of said stud, and a metallic sleeve, preferably stainless steel, e.g., 304 ss having an interference fit with said ceramic portion of said stud, to electrically isolate said stud from said sleeve. The invention contemplates an electrically heatable catalytic converter including at least one terminal as above described.

BRIEF DESCRIPTION OF THE DRAWINGS

The invention may be better understood by having reference to the annexed drawings showing a preferred embodiment of the invention and wherein.

DETAILED DESCRIPTION OF THE INVENTION

As indicated above, the present invention is a terminal or electrode especially useful for high temperature service in an electrically heatable catalytic converter. Prior terminal assemblies have been subject to leakage which causes oxygen sensors in the vehicle's emission system to malfunction. The present invention overcomes that problem.

Figure 1:
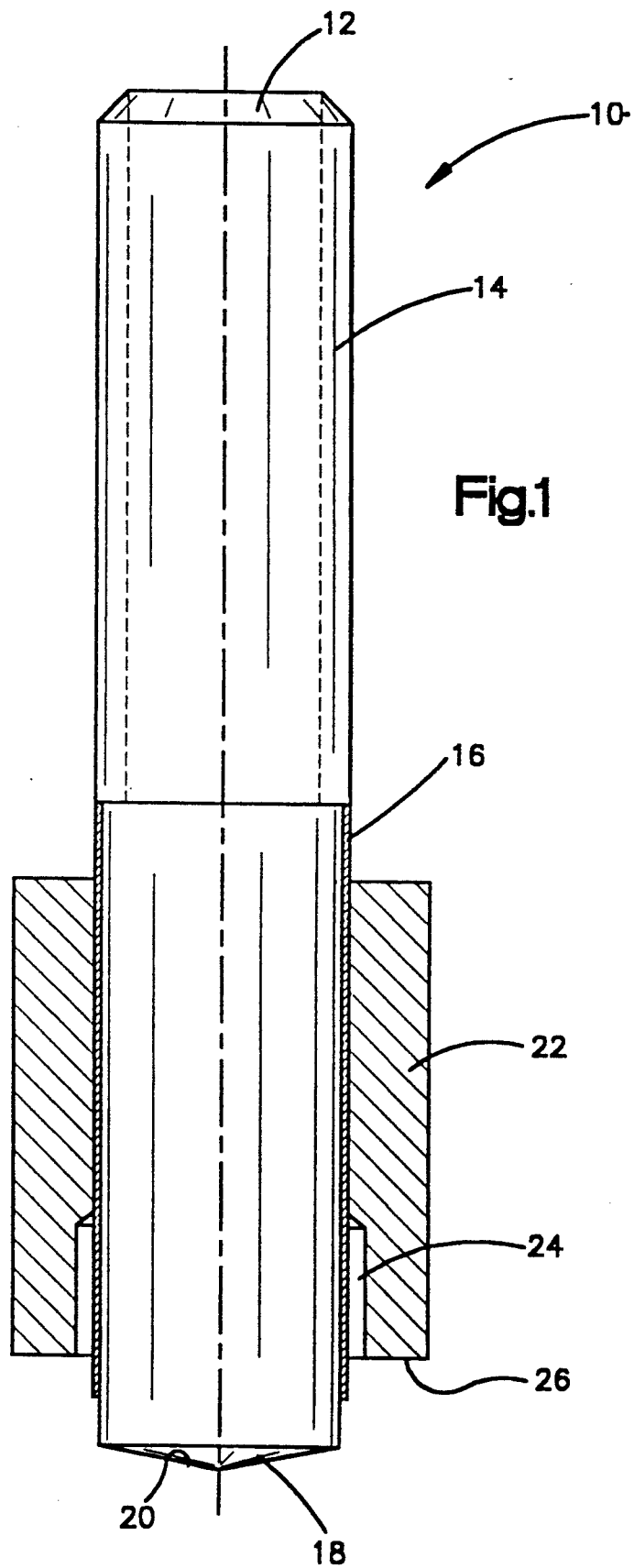
FIG. 1 is an elevation, partially in cross-section, showing a terminal or electrode in accordance with this invention.
Figure 2:
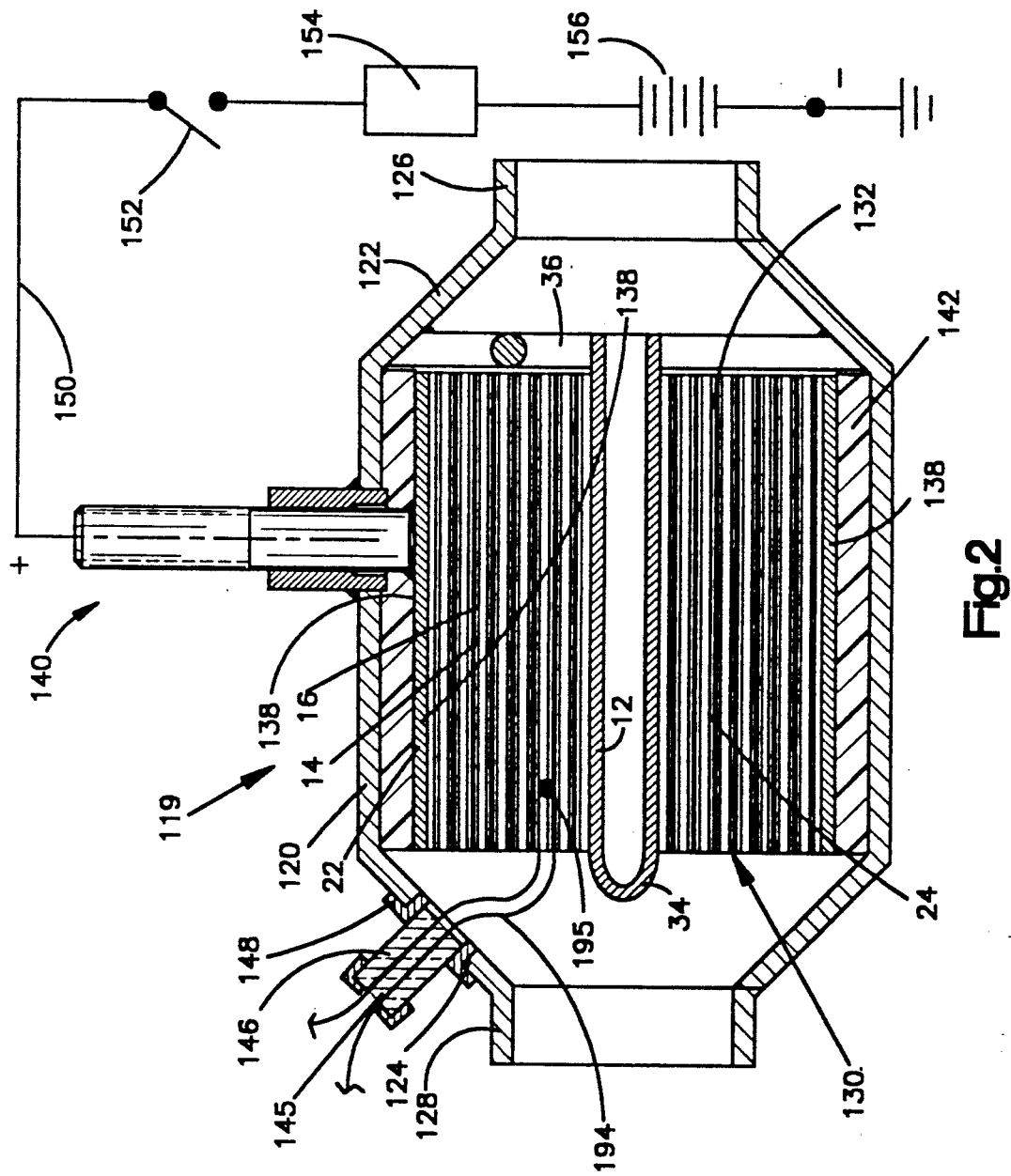
FIG. 2 is a cross-sectional view of an electrically heatable catalytic converter in accordance herewith.

That is shown in FIG. 1, in partial cross-section a preferred form of terminal or electrode in accordance with this invention. The entire structure is indicated by the numeral 10. The structure 10 includes a stud 12 having a threaded portion 14. This portion enables the attachment of a cable from a voltage source e.g., a 12 volt to 108 volt direct current battery, to an electrically heatable catalytic converter as schematically illustrated in FIG. 2. In the present case, the pole of the direct current voltage source is the positive pole. The stud is preferably nickel of high purity, e.g., 99.5% Ni, although it may be ferritic stainless steel. Other conducting metal alloys, e.g., nickel containing alloys may be used. The diameter is generally about 0.365".

The remaining portion, usually about half of the length of the stud, is coated with a refractory metal oxide layer which layer is from 0.017" to 0.005" plus or minus 0.002" thick. In the preferred case, for a 12 to 24 volt voltage source, this layer is 0.010" thick. Best results have been secured when the refractory metal oxide, e.g., alumina, alumina/titania, alumina/ceria, titania, titania/ceria etc., is plasma spray applied. Slight irregularities in the surface can be largely removed by sanding or otherwise abrading the coated surface, e.g., by centerless abrading. The final stud diameter is about 0.385" plus or minus 0.001."

The proximal end 18 of the stud 12 is configured conveniently as on a stud for stud welding, e.g., with a suitably contoured end 20, e.g., a conical tip. The final 0.15" of the stud is free of any coating.

To enable mounting of the electrode or terminal, there is provided a sleeve or collar 22 reamed for an interference fit, e.g., a press fit or a shrink-fit, with the coated portion 16 of the stud 18. There is conveniently provided a counterbore or recess 24 to space the proximal end 26 of the sleeve 22 from the coated portion 16 to prevent damage when the proximal end 26 is welded to the housing of an electrically heatable catalytic converter as shown, for example, in FIG. 2. To assemble the sleeve 22 to the coated portion 16 of the stud 12, the sleeve 22 is press fitted at room temperature over the coated portion 16 whereby the sleeve establishes an interference fit with the coated portion 16. This fit is air tight. The O.D. of the sleeve in a specific case was 0.63" and 0.75" long. The larger diameter bore was 0.45" and the reamed internal diameter was 0.3826" with an axial length of 0.5".

FIG. 2 shows a complete electrically heatable catalytic converter assembly 119 in cross section and ready for insertion in an exhaust line of an internal combustion engine. The converter 119 is provided with a stainless steel or nickel housing 120 having flared end caps 122 and 124, and nipple 126 and 128 integral therewith adapted to accommodate a standard exhaust pipe, e.g. a 2.5" internal diameter pipe. The housing 120 contains a core generally indicated at 130. The core 130 of FIG. 2 defines a plurality of generally axially extending cells 133 diagrammatically shown as a plurality of parallel lines. The core 130 is permeable to exhaust gas. It is formed of corrugated thin metal foils 132 which are coated with a refractory metal oxide coating having a noble metal catalyst, e.g., platinum, palladium, rhodium, ruthenium, or a mixture of two or more of such noble metals, deposited thereon. The gamma form of alumina is preferred as the refractory metal oxide. Other refractory metal oxides are mentioned above.

Strips 132 are secured to a central post 12 as by spot welding. A bullet shaped nose 34 is provided to close the tube 12. The strips 132, which may be uniformly coated strips, or a composite of two or more strips, e.g., corrugated and flat, or corrugated, flat and brazing foil are tightly spirally wound about the central post 12, wrapped in brazing foil, and surrounded with a retaining shell 138, desirably as two half shells, one of which has a terminal post generally indicated at 140, such as that shown in FIG. 1, extending therefrom for attachment of a cable 150 from a suitable voltage source. The half shells are seam welded together and the assembly induction heated to fuse the brazing foil and braze the distal ends of the foil strips 132 to the inside of the retaining shell 138. Induction heating extends only a short distance into the core 130 and does not destroy the catalyst.

The foregoing assembly is then wrapped in ceramic insulation 142, desirably 1/16" to ⅜" thick and inserted into the housing 120. A suitable ceramic felt is described in the patent to Hatch U.S. Pat. No. 3,916,057 dated Oct. 28, 1975. The insulation 142 electrically isolates the core 130 from the housing 120. The end caps 122 and 124 are the last parts to be attached as by welding. A thermocouple having a junction 195 may optionally be placed within the core 130 to sense temperature. The leads 194 pass through an insulator (desirably ceramic) and a bushing 148 extending through end cap 124.

A terminal assembly 140, such as shown in FIG. 1, is, as indicated above, threaded to accept a nut or pair of nuts to hold a cable connector, not shown, from cable 150. The cable 150 is schematically shown, and leads through a switch 152 and power switching means 154, such as described in Ser. No. 587,219, now abandoned, commonly owned with the present application and co-pending herewith and filed on Sep. 24, 1990. The power switching means 154 is connected to a battery 156 or an alternator, or both, to provide a driving force of 12 volts to 108 volts.

The opposite pole, or negative pole in this case, is connected from the housing 120 by a bar 36 welded at each end to the housing 120 and to the central post 12, respectively. The automobile chassis, to which the electrically heatable catalytic converter is attached, is grounded or negatively charged. Thus the electrical circuit is completed from the central post 12 through the thin metal strips forming the core 130 through the retaining shell 138 and positive terminal post 140.

The cell density of the core 130 is conveniently in the range of from 100 to 350 cells per square inch, preferably from 160 to 200 cells per square inch.

The catalytic converters hereof are referred to as "electrically heatable." This is to suggest that electric power is supplied for a small portion of the time the engine is at rest prior to starting up, and, if necessary, during operation of the engine at any time the temperature falls below a predetermined set point.

What is claimed is:

1. A terminal for an electrical connection comprising (a) a metallic stud threaded along a distal portion; (b) a ceramic coating about an axially extending proximate portion of said stud; and (c) a metallic sleeve having an air tight interference fit with said ceramic coated portion of said stud and having at the proximal portion of said stud an internal counterbore or recess to space the sleeve from the stud, whereby the stud is electrically isolated from said sleeve.

2. A terminal as defined in claim 1 wherein the ceramic coating is a refractory metal oxide coating.

3. A terminal as defined in claim 2 wherein the refractory metal oxide coating comprises alumina.

4. A terminal as defined in claim 3 wherein the refractory metal oxide coating comprises gamma alumina.

5. A terminal as defined in claim 3 wherein the refractory metal oxide coating comprises a mixture of refractory metal oxides.

6. A terminal as defined in claim 5 wherein the mixture of refractory metal oxides comprises alumina and ceria.

7. A terminal as defined in claim 5 wherein the mixture of refractory metal oxides comprises alumina and titania.

8. A terminal as defined in claim 1 wherein the ceramic coating is at least 0.01" thick.

9. A terminal as defined in claim 1 wherein the ceramic coating is from 0.017" to 0.005" thick plus or minus 0.002"

10. A terminal as defined in claim 1 wherein the metallic sleeve is stainless steel.

11. A terminal as defined in claim 1 wherein the stud is nickel.

12. A terminal as defined in claim 1 wherein the stud is threaded along the distal portion, has an axially extending thin, circumferential ceramic coating comprising alumina along its proximal portion, said coating being at least 0.01" thick, and the stud is nickel.

13. An electrically heatable catalytic converter comprising (1) a housing, (2) end cap adapters at each end of said housing for adapting said converter for insertion in an exhaust line, (3) a core comprising a central post, a plurality of corrugated thin stainless steel strips secured to said central post and spirally wound thereabout, a retainer shell about the free ends of said corrugated thin metal strips and brazed to said free ends; (4) insulation means between the housing and the core; (5) a terminal as defined in claim 1 secured to said retaining shell and to the outside of said housing for connecting said core to one pole of a voltage source, and (6) means for connecting the central post to the other pole of said voltage source.

* * * * *

UNITED STATES PATENT AND TRADEMARK OFFICE
CERTIFICATE OF CORRECTION

PATENT NO. : 5,238,650

DATED : August 24, 1993

INVENTOR(S) : Sheller et al

It is certified that error appears in the above-indentified patent and that said Letters Patent is hereby corrected as shown below:

Col. 3, line 17, after "portion," insert ---indicated at 16---.

Col. 4, line 27, after "insulator" insert ---tube 146---, and in line 27 after "(desirably ceramic)", insert ---in a ceramic sleeve 145---.

Signed and Sealed this

Twenty-fourth Day of May, 1994

Attest:

BRUCE LEHMAN

*Attesting Officer*    *Commissioner of Patents and Trademarks*